(12) United States Patent
Kim

(10) Patent No.: US 9,995,261 B2
(45) Date of Patent: *Jun. 12, 2018

(54) DYNAMIC SEAL FOR FUEL INJECTOR NEEDLE CHECK

(71) Applicant: Caterpillar Inc., Peoria, IL (US)

(72) Inventor: Hoisan Kim, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/689,307

(22) Filed: Apr. 17, 2015

(65) Prior Publication Data

US 2016/0305382 A1 Oct. 20, 2016

(51) Int. Cl.
| | |
|---|---|
| *B05B 7/12* | (2006.01) |
| *F02M 43/04* | (2006.01) |
| *F02M 61/12* | (2006.01) |
| *F02D 19/06* | (2006.01) |
| *F02D 19/10* | (2006.01) |

(52) U.S. Cl.
CPC ......... *F02M 43/04* (2013.01); *F02D 19/0694* (2013.01); *F02D 19/10* (2013.01); *F02M 61/12* (2013.01); *F02M 2200/16* (2013.01); *F02M 2200/44* (2013.01); *Y02T 10/36* (2013.01)

(58) Field of Classification Search
CPC .... F02M 34/04; F02M 61/12; F02M 2200/31; F02M 2547/008; F02M 57/026; F02M 45/086; F02D 19/0694; F02D 19/10

USPC .................................. 239/410, 533.1–533.3
See application file for complete search history.

(56) References Cited

U.S. PATENT DOCUMENTS

| | | | |
|---|---|---|---|
| 6,298,833 B1 | 10/2001 | Douville et al. | |
| 6,336,598 B1 | 1/2002 | Touchette et al. | |
| 6,422,199 B1* | 7/2002 | Buckley | F02M 45/086 |
| | | | 123/299 |
| 8,596,561 B2 | 12/2013 | Kim et al. | |
| 9,175,651 B2* | 11/2015 | Kim | F02M 43/04 |
| 2013/0118448 A1* | 5/2013 | Kim | F02M 63/029 |
| | | | 123/299 |
| 2013/0160741 A1* | 6/2013 | Sommars | F02M 43/04 |
| | | | 123/456 |
| 2014/0331962 A1 | 11/2014 | Stockner | |

* cited by examiner

*Primary Examiner* — Arthur O Hall
*Assistant Examiner* — Adam J Rogers
(74) *Attorney, Agent, or Firm* — Hostetler Baker; John Wappel

(57) ABSTRACT

A fuel injector includes an injector body defining a liquid fuel passage, a gaseous fuel passage, and a first guide bore; a gaseous fuel check guided within the first guide bore between a retracted position and an advanced position to selectively open and block, respectively, fluid communication between the gaseous fuel passage and a gaseous fuel nozzle outlet; and a sleeve seal seated within the first guide bore, the sleeve seal having an inner surface defining a sleeve seal bore therethrough, and at least a portion of the gaseous fuel check is disposed within the sleeve seal bore; an outer surface of the sleeve seal including a first portion and a second portion, the first portion being disposed closer to a longitudinal axis of the sleeve seal bore along a radial direction than the second portion.

17 Claims, 9 Drawing Sheets

US 9,995,261 B2

DYNAMIC SEAL FOR FUEL INJECTOR NEEDLE CHECK

TECHNICAL FIELD

The present disclosure relates generally to fluid injectors, and more particularly to a sleeve seal for a fuel injector.

BACKGROUND

Reciprocating internal combustion (IC) engines are known for converting chemical energy, which is stored in a fuel supply, into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

In conventional direct injection compression ignition engines, most if not all of the fuel is injected into the variable volume a short ignition delay time before the desired ignition timing. In other compression ignition engines, such as homogeneous charge compression ignition (HCCI) engines, a fuel is substantially premixed with an oxidizer and ignited by compression within the variable volume. Premixing of the fuel and oxidizer may be achieved by injecting the fuel into the oxidizer upstream of the variable volume, injecting the fuel into the variable volume relatively early in a compression stroke, or combinations thereof.

Engines operating with fuels having relatively low Cetane values, such as natural gas, may benefit from supplemental ignition sources such as a spark plug or a pilot injection of a fuel having a relatively high Cetane value, such as distillate diesel fuel. For example, an engine may substantially premix a low-Cetane fuel with an oxidizer within a variable volume and then ignite the mixture of low-Cetane fuel and oxidizer by directly injecting an amount of high-Cetane fuel into the variable volume a short time delay before the desired ignition timing. In such a dual fuel configuration, compression ignition of the high-Cetane fuel may effect or promote ignition of the mixture of the low-Cetane fuel and the oxidizer.

In some dual fuel engine systems, a gaseous fuel is a low-Cetane fuel and a liquid fuel is a high-Cetane fuel, and injection of the liquid fuel and the gaseous fuel is controlled by two separate needle checks within a fuel injector connected to both a gaseous fuel common rail and a liquid fuel common rail. Where concentric needle checks are used, an outer check may be used to selectively open and close a gaseous fuel outlet, and an inner check may be used to selectively open and close a liquid fuel outlet. In other systems, adjacent rather than coaxial needle checks are used. An adjacent needle check design, which employs hydraulic control pressure from a liquid fuel common rail applied to each of the needle checks may be used to control opening and closing of a corresponding nozzle outlet.

U.S. Pat. No. 7,627,416 (the '416 patent) purports to describe a dual fuel common rail design in which liquid diesel fuel and natural gas fuel are both injected from a single fuel injector associated with each engine cylinder. The '416 patent recognizes that there may be instances in which the engine will need to operate solely on liquid diesel fuel due to exhaustion of the natural gas fuel supply or possibly due to a fault in the natural gas fuel supply portion of the system. However, problems and challenges associated with disparate liquid fuel pressure and the gaseous fuel pressure, such as leakage between the liquid fuel system and the gaseous fuel system across the needle checks, are neither recognized nor addressed in the '416 patent. Accordingly, improved dual fuel injectors are desired to address the aforementioned problems and/or other problems known in the art.

It will be appreciated that this background description has been created to aid the reader, and is not to be taken as an indication that any of the indicated problems were themselves known in the art.

SUMMARY

According to one aspect of the disclosure, a fuel injector for an internal combustion engine includes an injector body defining a liquid fuel passage extending between a liquid fuel inlet and a liquid fuel outlet, a gaseous fuel passage extending between a gaseous fuel inlet and a gaseous fuel nozzle outlet, and a first guide bore. The fuel injector has a gaseous fuel check guided within the first guide bore between a retracted position and an advanced position to selectively open and block, respectively, fluid communication between the gaseous fuel passage and the gaseous fuel nozzle outlet. A sleeve seal is seated within the first guide bore, and the sleeve seal has an inner surface defining a sleeve seal bore therethrough, and at least a portion of the gaseous fuel check is disposed within the sleeve seal bore. An outer surface of the sleeve seal includes a first portion and a second portion, the first portion being disposed closer to a longitudinal axis of the sleeve seal bore along a radial direction than the second portion, the radial direction being perpendicular to the longitudinal axis. The first portion of the outer surface of the sleeve seal is in fluid communication with the liquid fuel passage. A distal portion of the gaseous fuel check extends along the longitudinal axis on a first side of the sleeve seal, and is in fluid communication with the gaseous fuel inlet. A proximal portion of the gaseous fuel check extends along the longitudinal axis on a second side of the sleeve seal, opposite of the first side of the sleeve seal, and is in fluid communication with the liquid fuel passage.

According to another aspect of the disclosure, a dual fuel system for an internal combustion engine includes a liquid fuel supply, a gaseous fuel supply, and a plurality of fuel injectors for supplying liquid fuel from the liquid fuel supply and supplying gaseous fuel from the gaseous fuel supply into cylinders of the internal combustion engine. Each fuel injector of the plurality of fuel injectors includes an injector body defining a liquid fuel passage extending between a liquid fuel inlet and a liquid fuel outlet, a gaseous fuel passage extending between a gaseous fuel inlet and a gaseous fuel nozzle outlet, and a first guide bore. Each fuel injector includes a gaseous fuel check guided within the first guide bore between a retracted position and an advanced position to selectively open and block, respectively, fluid communication between the gaseous fuel passage and the gaseous fuel nozzle outlet. A sleeve seal is seated within the first guide bore, and the sleeve seal has an inner surface defining a sleeve seal bore therethrough, and at least a portion of the gaseous fuel check is disposed within the sleeve seal bore. An outer surface of the sleeve seal includes a first portion and a second portion, the first portion being disposed closer to a longitudinal axis of the sleeve seal bore along a radial direction than the second portion, the radial direction being perpendicular to the longitudinal axis. The first portion of the outer surface of the sleeve seal is in fluid communication with the liquid fuel passage. A distal portion of the gaseous fuel check extends along the longitudinal axis on a first side of the sleeve seal, and is in fluid communication with the gaseous fuel inlet. A proximal portion of the gaseous fuel check extends along the longitudinal axis on a second side of the sleeve seal, opposite of the first side of the sleeve seal, and is in fluid communication with the liquid fuel passage.

According to another aspect of the disclosure, a fuel injector for a dual fuel system of an internal combustion engine includes an injector body defining a liquid fuel passage extending between a liquid fuel inlet and a liquid fuel outlet, a gaseous fuel passage extending between a gaseous fuel inlet and a gaseous fuel nozzle outlet, and a first guide bore. The first guide bore includes a first section, a second section, and a seat portion located between the first section and the second section. A gaseous fuel check is guided within the injector body between a retracted position and an advanced position to selectively open and block, respectively, fluid communication between the gaseous fuel passage and the gaseous fuel nozzle outlet to control injection of gaseous fuel from the gaseous fuel nozzle outlet into a cylinder of the internal combustion engine. Seal means for limiting leakage of liquid fuel between at least the first section of the first guide bore and an outer surface of the gaseous fuel check, the first section having a diameter that is larger than a diameter of the second section.

DETAILED DESCRIPTION

Figure 1:
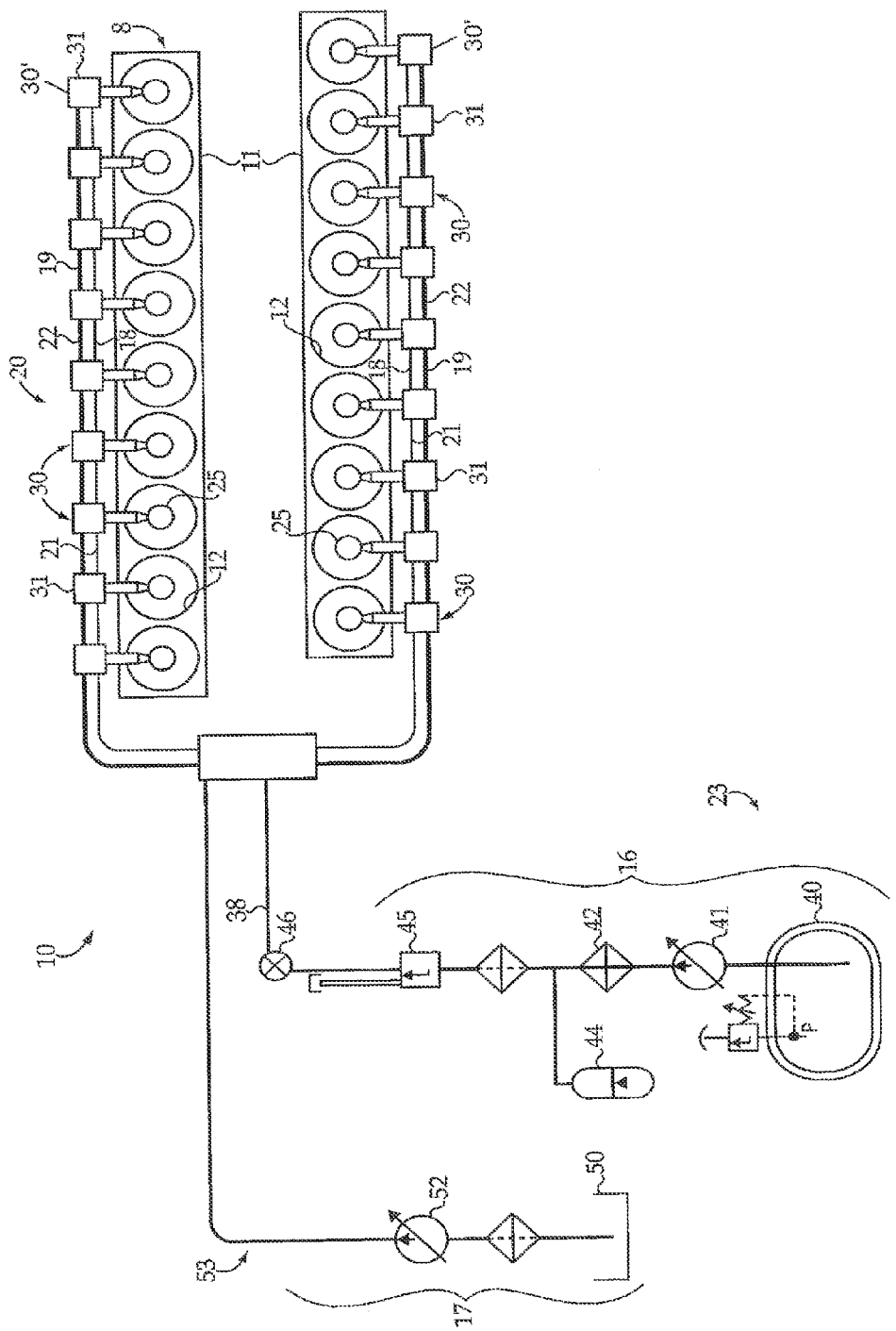
FIG. 1 is a schematic view of a dual fuel engine system in accordance with aspects of the disclosure.

Aspects of the disclosure will now be described in detail with reference to the drawings, wherein like reference numerals refer to like elements throughout, unless specified otherwise.

Figure 2:
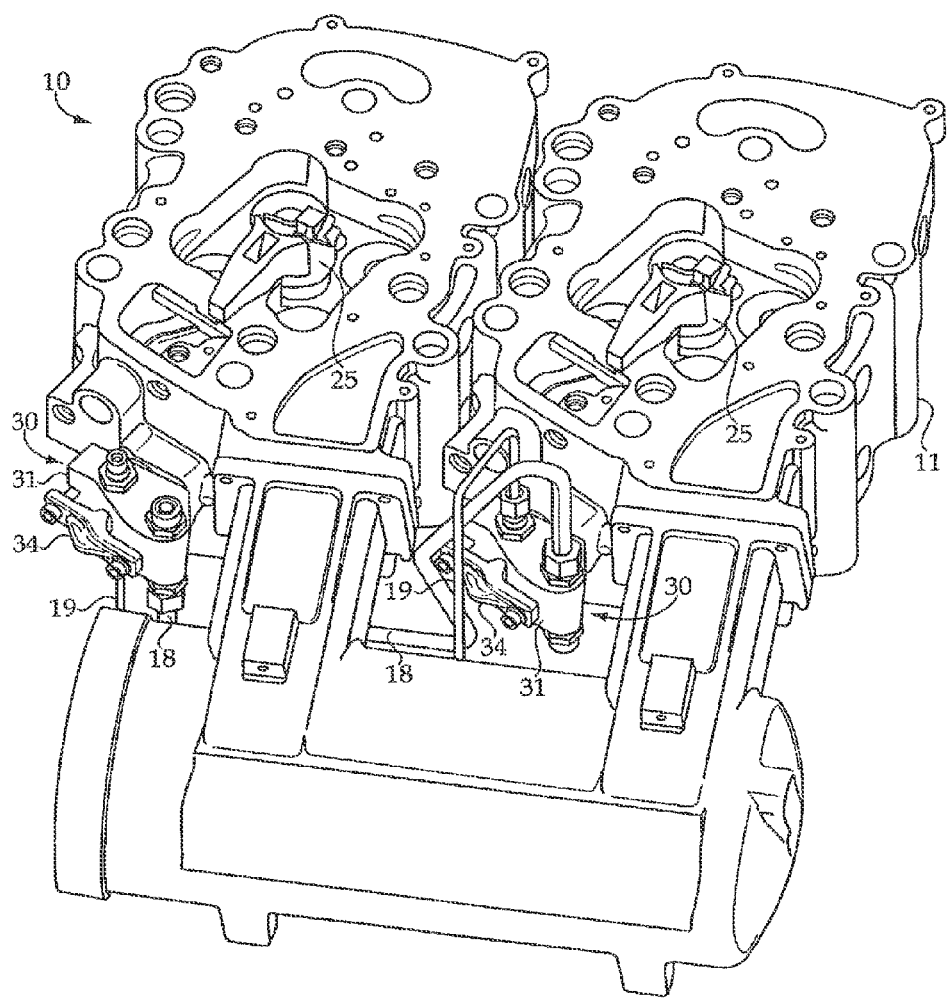
FIG. 2 is a perspective view of a portion of a dual fuel system in accordance with aspects of the disclosure.
Figure 3:
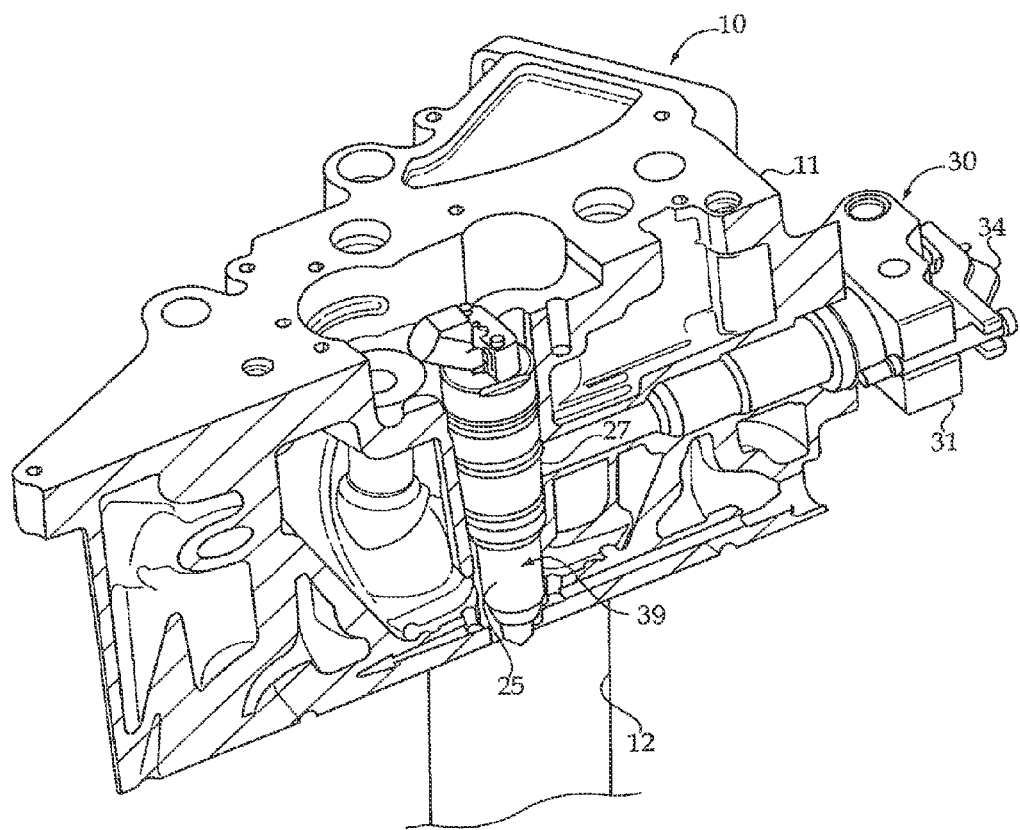
FIG. 3 is a perspective partial-sectional view of a portion of the dual fuel system shown in FIG. 2, illustrating a fuel injector and an engine cylinder in accordance with aspects of the disclosure.

FIGS. 1-3 show an engine 8 and a dual fuel engine system 10. The engine 8 may include an engine housing 11 which may define a plurality of engine cylinders 12. The dual fuel engine system 10 may include a dual fuel system 20 mounted to the engine housing 11 of the engine 8. The dual fuel system 20 may include at least one fuel injector 25 positioned for direct injection into at least one cylinder of the plurality of engine cylinders 12. A gaseous fuel common rail 21 and a liquid fuel common rail 22 may be fluidly connected to each of the at least one fuel injector 25, and are parts of a gaseous fuel subsystem 23 and a liquid fuel subsystem 53 of the dual fuel system 20, respectively. The liquid fuel may include distillate diesel fuel, biodiesel, dimethyl ether, gasoline, ethyl alcohol, liquid-phase natural gas, liquid-phase propane, combinations thereof, or any other combustible liquid known in the art. The gaseous fuel may include natural gas, propane, ethylene, butane, hydrogen, combinations thereof, or any other combustible gas known in the art. The dual fuel system 20 may also include a gaseous fuel supply and pressure control mechanism 16 (hereinafter referred to as "gaseous fuel control mechanism") as well as a liquid fuel supply and pressure control mechanisms 17 (hereinafter referred to as "liquid fuel control mechanism") fluidly connected to the gaseous fuel common rail 21 and the liquid fuel common rail 22, respectively.

In one aspect, a gaseous fuel conduit 38 may fluidly connect the gaseous fuel control mechanism 16 to the gaseous fuel common rail 21 by way of a shutoff valve 46. Each of the fuel injectors 25, the gaseous fuel control mechanism 16, and the liquid fuel control mechanism 17 may be in control communication with, and controlled by, an electronic engine control unit (not shown) in a known manner. The gaseous fuel control mechanism 16 may include a pressurized cryogenic liquefied natural gas supply or tank 40 with an outlet fluidly connected to a variable delivery cryogenic pump 41. The gaseous fuel control mechanism 16 may also include a heat exchanger 42, an accumulator 44, a fuel conditioning module 45 that controls the supply and pressure of gaseous fuel to the gaseous fuel common rail 21, and one or more gaseous fuel filters, pressure sensors, and possibly still other diagnostic, control, and monitoring components. A pressure relief valve (not shown) may be positioned within or in-line with the gaseous fuel conduit 38. The gaseous fuel control mechanism 16 may supply gaseous fuel to the gaseous fuel common rail 21 at a supply pressure that is lower than a supply pressure of the liquid fuel.

In one aspect, the liquid fuel control mechanism 17 may include a diesel fuel supply or tank 50, a fuel filter, and an electronically controlled high pressure fuel pump 52 that supply liquid fuel to, and control pressure in, the liquid fuel common rail 22. The liquid fuel control mechanism 17 may supply liquid fuel to the liquid fuel common rail 22 at a range of higher fuel pressures relative to the supply pressure of the gaseous fuel. The gaseous fuel pressure and liquid fuel pressure may each be adjustable for reasons which will be understood by those skilled in the art, but in general, liquid fuel pressures may generally be higher than gaseous fuel pressures, at least within the gaseous fuel common rail 21 and the liquid fuel common rail 22.

Figure 4:
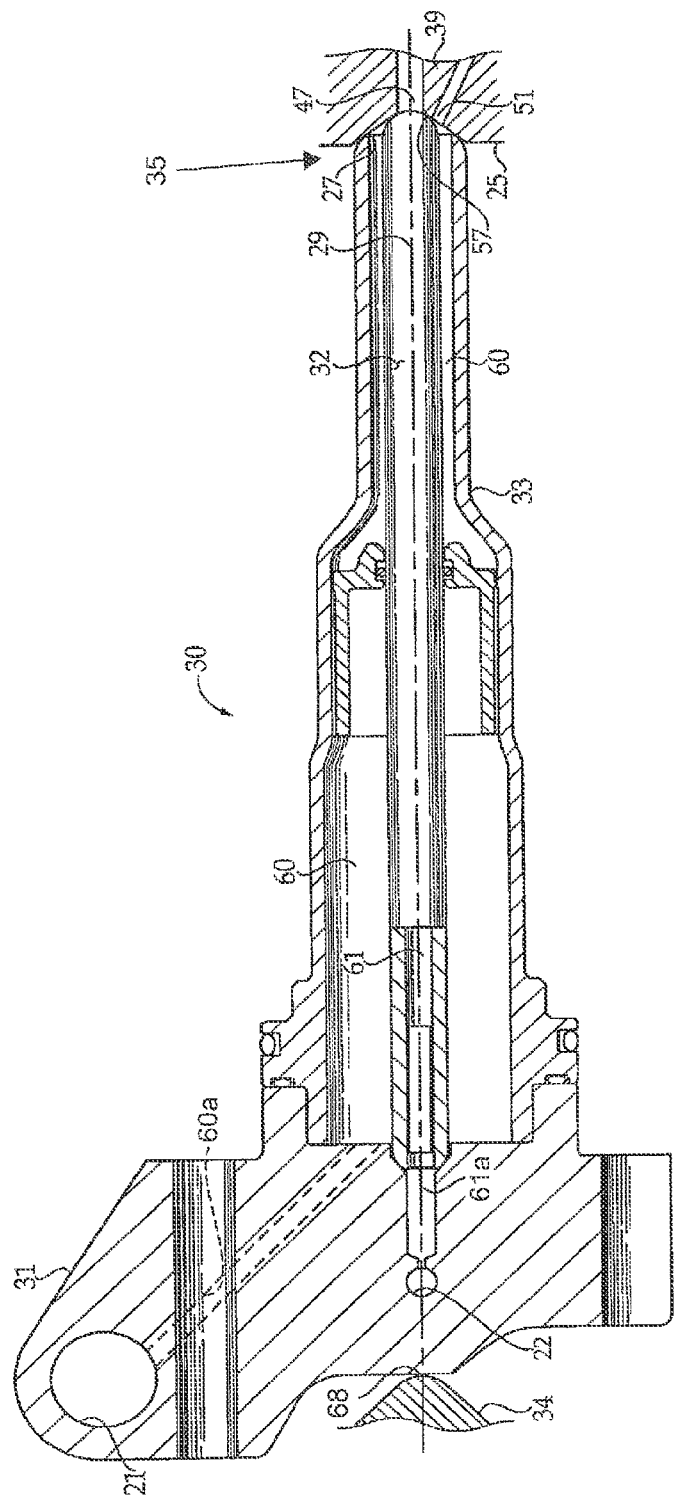
FIG. 4 is a cross-sectional view of a coaxial quill connector assembly taken along a plane including an axis of the coaxial quill connector in accordance with aspects of the disclosure.

FIG. 4 shows a cross-sectional view of a coaxial quill connector 30 taken along a plane including an axis 29 of the coaxial quill connector 30. In one aspect, the dual fuel system 20 may include the coaxial quill connector 30, which may have an inner quill 32 defining an inner fuel passage 61 and an outer quill 33 defining an outer fuel passage 60. The coaxial quill connector 30 may include a tip 35 in sealing contact with a common conical seat 27 of one of the fuel injectors 25. Each of a plurality of similar or identical coaxial quill connectors 30 may be coupled, respectively, to one of the fuel injectors 25. The dual fuel system 20 may include a plurality of blocks 31 which may be daisy-chained together with gaseous fuel line segments 18 and liquid fuel line segments 19 to form the gaseous fuel common rail 21 and the liquid fuel common rail 22, respectively. Each of the blocks 31 may be associated with a respective coaxial quill connector 30. A last coaxial quill connector 30' in the daisy-chain may include a set of plugs in place of fittings shown in FIG. 2. The coaxial quill connectors 30 may thus be fluidly positioned between each fuel injector of the plurality of fuel injectors 25 and each of the gaseous fuel common rail 21 and the liquid fuel common rail 22. Each coaxial quill connector 30 may further include a load adjusting clamp 34 with a pivot surface 68 in contact with one of blocks 31 at a load adjustment location, which may be positioned to intersect the axis 29 of the inner quill 32.

In one aspect, each of the blocks 31 may define a segment of the gaseous fuel common rail 21 and may be oriented perpendicular to the axis 29 of the inner quill 32. Each of the blocks 31 may define a passage 60a that opens at one end into the gaseous fuel common rail 21 and opens at another end into the outer fuel passage 60 of the outer quill 33. Each of the blocks 31 may define a passage 61a that opens at one end into the liquid fuel common rail 22 and opens at another end into the inner fuel passage 61 of the inner quill 32.

In one aspect, the outer fuel passage 60 may open at one end into the gaseous fuel common rail 21 and may open at another end into a gaseous fuel inlet 51 defined by an injector body 39 of the fuel injector 25. The inner fuel passage 61 may open at one end into the liquid fuel common rail 22, and may open at another end into a liquid fuel inlet 47 defined by the fuel injector body 39. The coaxial quill connector 30 may form a metal-to-metal seal 57 with the fuel injector body 39. The metal-to-metal seal 57 may separate the outer fuel passage 60 and the inner fuel passage 61, and may also separate the liquid fuel inlet 47 and the gaseous fuel inlet 51, which are respectively connected to gaseous and liquid fuel passages within the fuel injector 25, as will be further described herein. The outer fuel passages 60 and the inner fuel passage 61 may be fluidly connected to the liquid and gaseous fuel passages in the fuel injector 25 with the liquid fuel common rail 22 and the gaseous fuel common rail 21, respectively. In one aspect, the liquid fuel common rail 22 and the gaseous fuel common rail 21 may be fluidly connected to the liquid and gaseous fuel passages associated with the liquid fuel supply or tank 50 and the gaseous fuel supply or tank 40, respectively.

Figure 5:
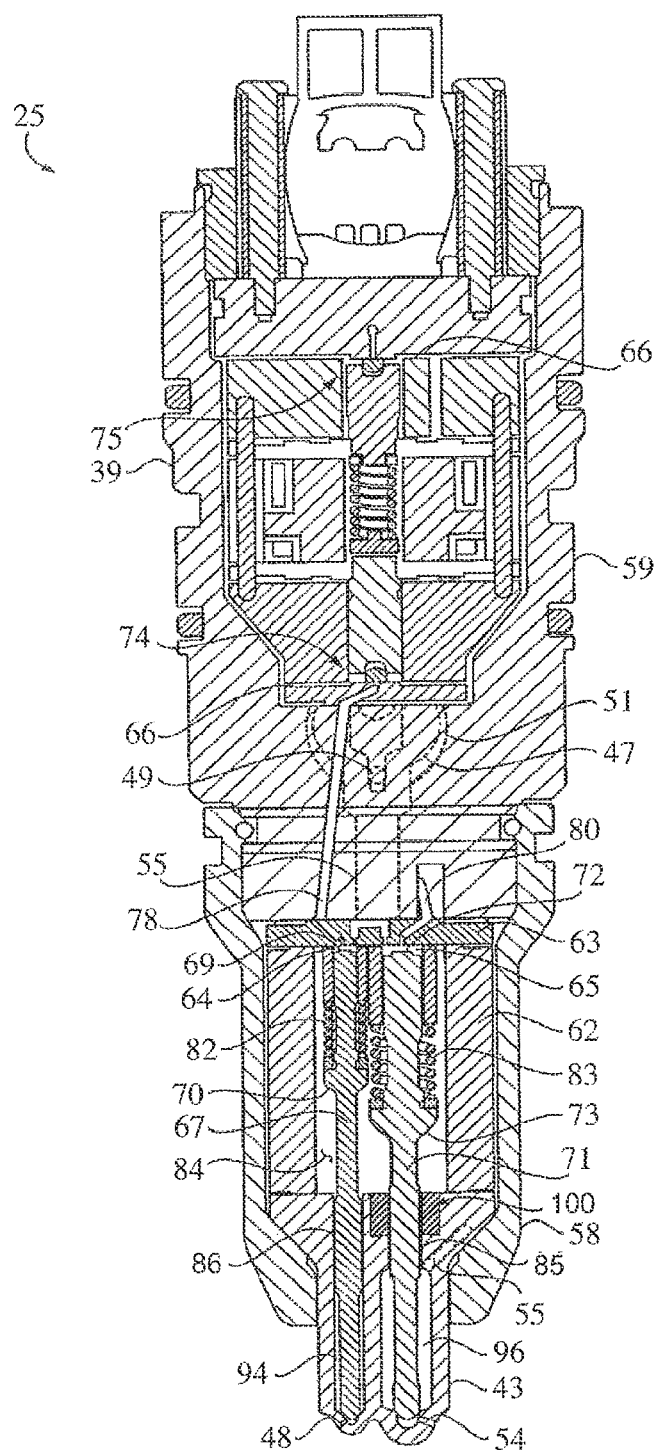
FIG. 5 is a cross-sectional diagrammatic view of a fuel injector taken along a plane including a longitudinal axis of a first check and a longitudinal axis of a second check in accordance with aspects of the disclosure.
Figure 6:
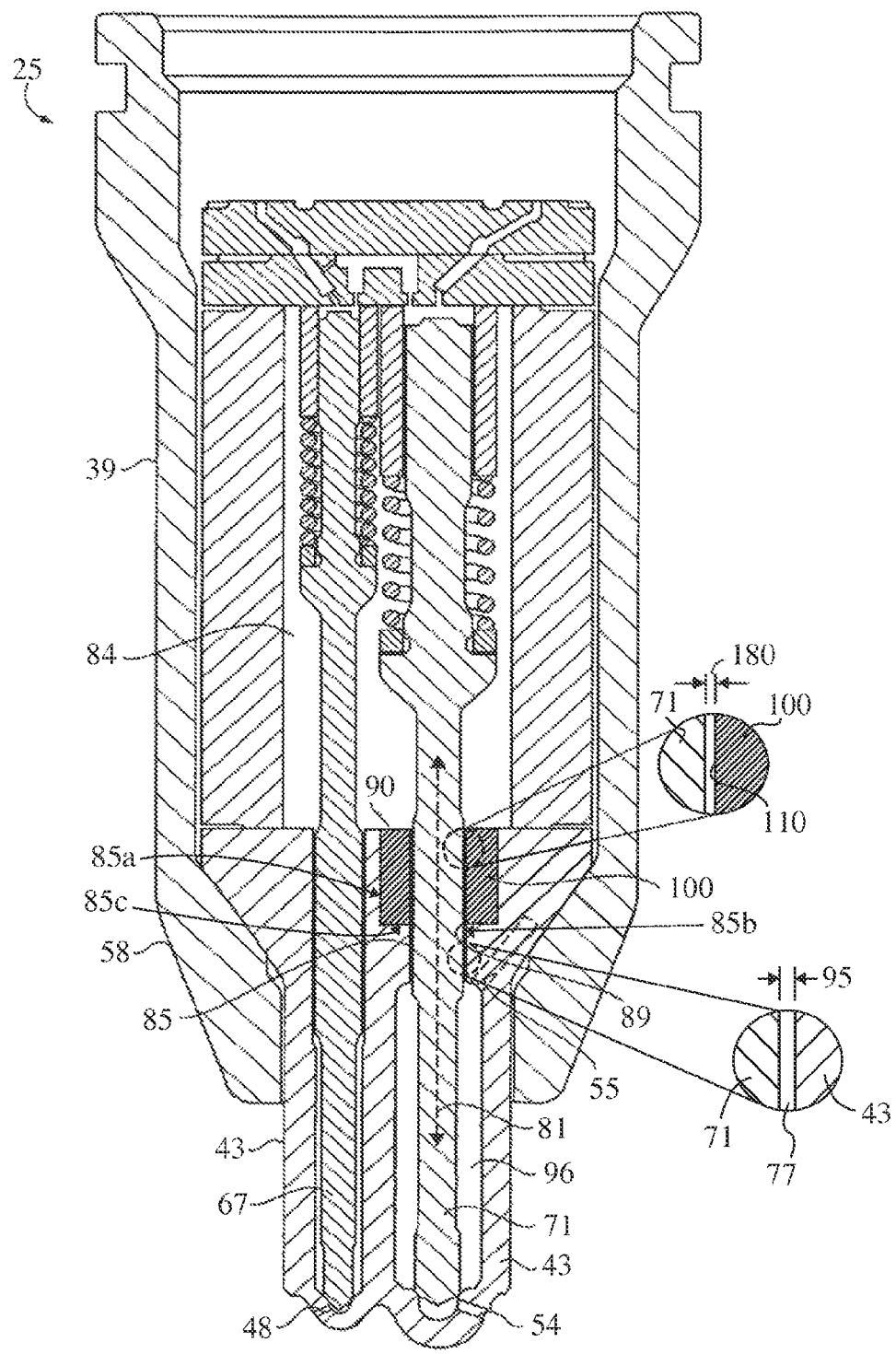
FIG. 6 is a cross-sectional diagrammatic of a portion of the fuel injector in FIG. 5.

Referring to FIG. 5, the injector body 39 may include a nozzle tip piece 43 extending into the cylinder 12 of the engine 8. The injector body 39 may define a liquid fuel nozzle outlet 48, and a liquid fuel supply passage 49 may extend between the liquid fuel inlet 47 and the liquid fuel nozzle outlet 48. The injector body 39 may further define a gaseous fuel nozzle outlet 54, and a gaseous fuel supply passage 55 may extend between the gaseous fuel inlet 51 and the gaseous fuel nozzle outlet 54. In one aspect, the liquid fuel pressure may be higher than the gaseous fuel pressure, as noted above. Each of the liquid fuel nozzle outlet 48 and the gaseous fuel nozzle outlet 54 may include a plurality of spray orifices formed in the nozzle tip piece 43. The liquid fuel nozzle outlet 48 and the gaseous fuel nozzle outlet 54 may be vertically offset from one another, with respect to a longitudinal axis of the injector body, as shown in FIGS. 5 and 6. A variety of internal components of the fuel injector 25, which may be electronically controlled, may be used to selectively control the opening and closing of the liquid fuel nozzle outlet 48 and the gaseous fuel nozzle outlet 54 in a manner that will be described in further detail below.

In one aspect, the injector body 39 may include a plurality of body pieces, including the nozzle tip piece 43. The nozzle tip piece 43 may be positioned within an outer body piece 58, and the outer body piece 58 may be attached to a clamping body piece or upper body piece 59. The upper body piece 59 may be threadingly coupled to the outer body piece 58, and may be rotated to clamp together internal components of the fuel injector 25. In one aspect, dowels or any other suitable method and/or apparatus may be used to align internal components of the fuel injector 25 during assembly to obtain the desired fluid connections discussed herein. The injector body 39 may also include an inner body piece 62 and an orifice plate 63 clamped between the upper body piece 59 and the nozzle tip piece 43. The injector body 39 may include a chamber 84 defined between the nozzle tip piece 43, the inner body piece 62, and the orifice plate 63. The chamber 84 may form a segment of the fuel supply passage 49 for conveying liquid fuel to the liquid fuel nozzle outlet 48.

In one aspect, the injector body 39 may define a first check control chamber 64 and a second check control chamber 65, each in fluid communication with the liquid fuel inlet 47 and a drain or a low pressure space 66. The low pressure space 66 may comprise any combination or configuration of outlets, spaces, clearances between components, or leak paths, so long as a pressure gradient from the first check control chamber 64 and the second check control chamber 65 to the low pressure space 66 can be established to enable fuel injection control.

In one aspect, the nozzle tip piece 43 may define a first guide bore 85. The fuel injector 25 may include a gaseous fuel check 71 received at least partially within the first guide bore 85. The gaseous fuel check 71 may be a needle check. The gaseous fuel check 71 may be guided within the injector body 39 between a retracted position and an advanced position to selectively open or block, respectively, fluid communication between the gaseous fuel supply passage 55 and the gaseous fuel nozzle outlet 54. Actuation of the gaseous fuel check 71 between the retracted position and the advanced position may be used to control injection of gaseous fuel from the gaseous fuel nozzle outlet 54 into a corresponding cylinder 12 of the engine 8.

In one aspect, the gaseous fuel check 71 may have a closing hydraulic surface 72 exposed to a fluid pressure of the first check control chamber 64 and an opening hydraulic surface 73 exposed to the fuel pressure of the liquid fuel supply passage 49 within the chamber 84. The gaseous fuel check 71 may have opening gas pressure surfaces exposed to a gas pressure of gaseous fuel supply passage 55 in a nozzle chamber 96, but may typically be urged open based at least in part on hydraulic pressure.

In one aspect, the nozzle tip piece 43 may define a second guide bore 86. The fuel injector 25 may include a liquid fuel check 67 received at least partially within the second guide bore 86. The liquid fuel check 67 may be a needle check. The liquid fuel check 67 may be positioned side-by-side with the gaseous fuel needle check 71, and may be parallel with the gaseous fuel needle check 71. The liquid fuel check 67 may be guided within the injector body 39 between a retracted position and an advanced position to selectively open or block, respectively, fluid communication between the liquid fuel supply passage 49 and the liquid fuel nozzle outlet 48. Actuation of the liquid fuel check 67 between the retracted position and the advanced position may be used to control injection of liquid fuel from the liquid fuel nozzle outlet 48 into the corresponding cylinder 12 of the engine 8.

In one aspect, the liquid fuel check 67 may have a closing hydraulic surface 69 exposed to a fluid pressure of a second check control chamber 65, and may have an opening hydraulic surface 70 exposed to a fuel pressure of the liquid fuel supply passage 49 within the chamber 84. Referring back to FIG. 2, the liquid fuel supply passage 49 is partially hidden from view, however, it will be understood by those skilled in the art that the passage extends through the components positioned between inlet 47 and outlet 48 to supply liquid fuel for injection. A nozzle chamber 94 may connect the chamber 84 and the liquid fuel nozzle outlet 48.

In one aspect, the fuel injector 25 may include a liquid fuel injection control valve 74 and a gaseous fuel injection control valve 75, positioned fluidly between the first check control chamber 64 and the second check control chamber 65, respectively, and a low pressure space 66. In one aspect, as illustrated in FIG. 5, each of the liquid fuel injection control valve 74 and the gaseous fuel injection control valve 75 may be a part of an electrically actuated control valve assembly having at least one valve member, an armature, and a solenoid. A first drain passage 78 may fluidly connect with the second check control chamber 65 with control valve 74, which may be actuated to reduce a pressure in the second check control chamber 65 such that a closing hydraulic force acting on the closing hydraulic surface 69 is reduced, enabling the fuel pressure of liquid fuel supply passage 49, via the opening hydraulic surface 70, to lift the liquid fuel check 67 and open the liquid fuel nozzle outlet 48.

In one aspect, another drain passage 80 may fluidly connect the first check control chamber 64 to the gaseous fuel injection control valve 75 to enable opening of the gaseous fuel check 71 to inject gaseous fuel via the gaseous fuel nozzle outlet 54. In contrast with certain known dual fuel strategies, hydraulic pressure, as opposed to gas pressure, may act on an opening hydraulic surface of both the liquid fuel and gaseous fuel needle checks, although the present disclosure is not thusly limited. To end injection, the liquid fuel injection control valve 74 and the gaseous fuel injection control valve 75 may be deactivated, either energized or de-energized as the case may be, to restore the fluid pressure in the first check control chamber 64 and the second check control chamber 65 to the liquid fuel rail pressure. The liquid fuel injection control valve 74 and the gaseous fuel injection control valve 75 may be of any suitable configuration and could each include a 2-way valve as shown, a 3-way valve, or still another configuration.

In one aspect, the fuel injector 25 may further include a first spring 82 biasing the liquid fuel check 67 closed, sealing the liquid fuel nozzle outlet 48, and a second spring 83 biasing the gaseous fuel check 71 closed to seal the gaseous fuel nozzle outlet 54. Opening of the liquid fuel check 67 or the gaseous fuel check 71 may occur in opposition to a bias of the corresponding spring. Closing of the liquid fuel check 67 or the gaseous fuel check 71 may occur in opposition to fluid pressures opposing the closing pressure provided in control the first check control chamber 64 and the second check control chamber 65. In the case of the gaseous fuel check 71, gas pressure may act on the tip, in opposition to the closing pressure in the first check control chamber 64.

As discussed above, the opening hydraulic surface 70 of the liquid fuel check 67 and the opening hydraulic surface 73 of the gaseous fuel check 71 may be exposed to the fuel pressure of the liquid fuel supply passage 49 and the fuel pressure is typically equal to a fuel pressure in common rail 22. In one aspect, the liquid fuel check 67 and the gaseous fuel check 71 may each be positioned partially within the chamber 84, which forms a segment of the liquid fuel supply passage 49. The chamber 84 may house the first spring 82 and the second spring 83 positioned therein, and thus may be understood as a spring chamber. The opening hydraulic surfaces 70 and 73 may thus be exposed to the fuel pressure within the same chamber 84. As an alternative, multiple spring chambers or some other configuration for supplying liquid rail pressure to the opening hydraulic surfaces may be used.

Referring now to FIG. 6, liquid fuel may be supplied from the liquid fuel common rail 22 to the liquid fuel supply passage 49 at a high pressure, and gaseous fuel may be supplied from the gaseous fuel common rail 21 to the gaseous fuel supply passage 55 at a medium pressure, which is lower than the high pressure of the liquid fuel supply passage 49. In one aspect, during a liquid fuel only mode, a pressure differential between the medium pressure of the gaseous fuel supply passage 55 and the high pressure of the liquid fuel supply passage 49 may be about 40 MPa to 80 MPa. Higher pressure differentials during the liquid fuel only mode are also contemplated, and these higher pressure differentials may be greater than 80 MPa, or may be greater than 100 MPa. In one aspect, during a mixed or dual fuel mode, the pressure differential between the gaseous fuel supply passage 55 and the liquid fuel supply passage 49 may be about 5 to 80 MPa. Higher pressure differentials during the mixed or dual fuel mode are contemplated, and these higher pressure differentials may be greater than 80 MPa, or may be greater than 100 MPa.

In one aspect, due to manufacturing tolerances of the gaseous fuel check 71 and an inner surface of the nozzle tip piece 43, a leak path 77 may allow leakage of liquid fuel from the liquid fuel supply passage 49 to the gaseous fuel supply passage 55. In one aspect, the leak path 77 may be formed by a clearance 95 located between the outer surface of the gaseous fuel check 71 and the inner surface of the nozzle tip piece 43. Generally, a small amount of leaked liquid fuel can be expelled out through the gaseous fuel nozzle outlet 54 during gaseous fuel injection.

A controlled amount of leakage may be desired to enable relatively small quantities of liquid fuel to migrate through the leak path 77 in order to lubricate surfaces of the gaseous fuel check 71 contacting surfaces of the nozzle tip piece 43. In certain instances, it may be desirable to operate the dual fuel engine system 10 in liquid fuel only mode, such as when there are faults with the gaseous fuel subsystem 23, during start-up or diagnostic operation, or where the dual fuel engine system 10 runs out of gaseous fuel, for example. It may then be desirable to reduce and ideally eliminate migration of liquid fuel that may occur through the leak path 77 in order to avoid liquid fuel accumulating in or damaging the gaseous fuel subsystem 23. To this end, the fuel injector 25 may include a sleeve seal 100 seated within the first guide bore 85 and positioned about the gaseous fuel check 71, as shown in FIGS. 5 and 6. By providing the sleeve seal 100 separate from the guide bore 85, manufacturing may be simplified and production costs may be reduced. The first guide bore 85 may include a first section 85a, a second section 85b, and a seat portion 85c located between the first section 85a and the second section 85b. The first section 85a includes a diameter that may be larger than a diameter of the second section 85b.

Figure 7:
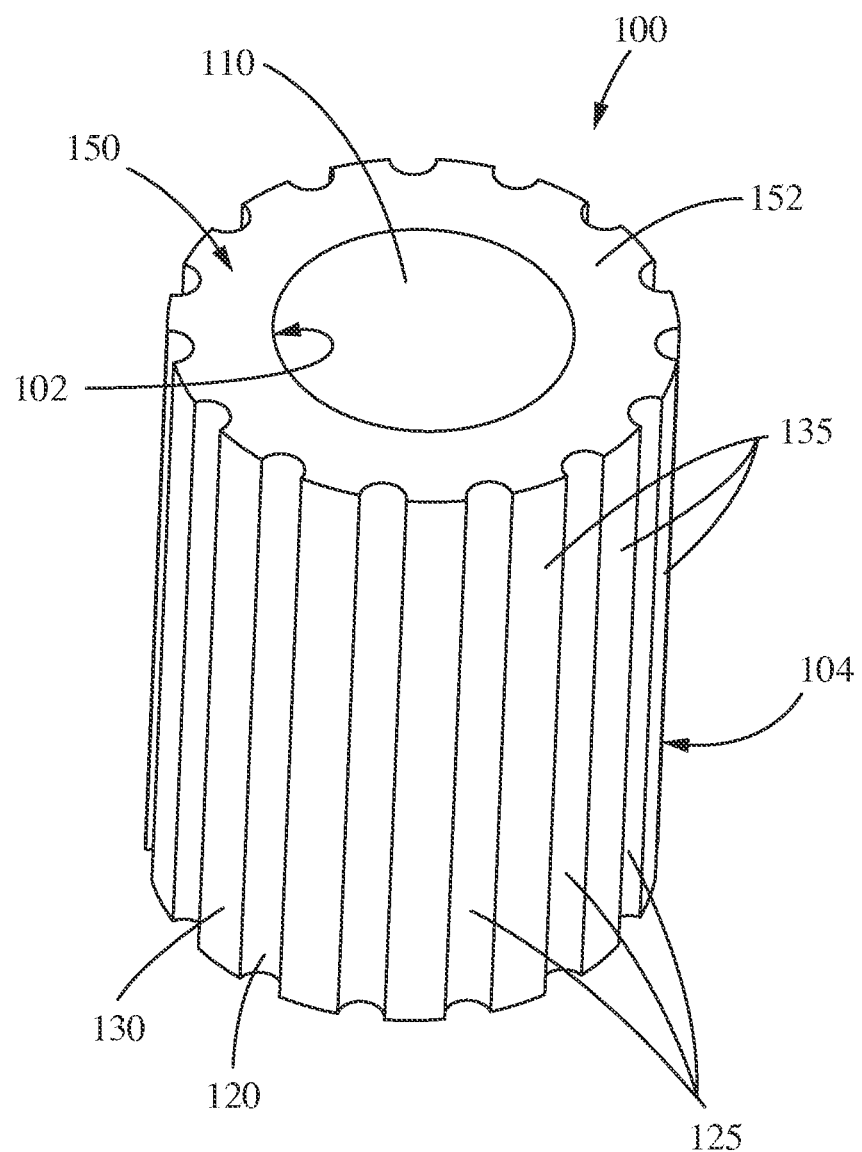
FIG. 7 is a perspective view of a sleeve seal in accordance with aspects of the disclosure.
Figure 8:
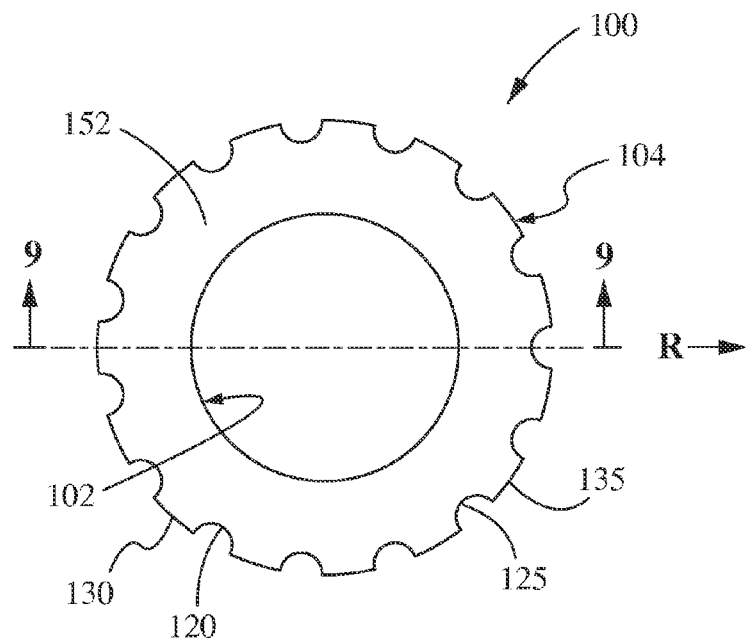
FIG. 8 is a top view of the sleeve seal in FIG. 7.
Figure 9:
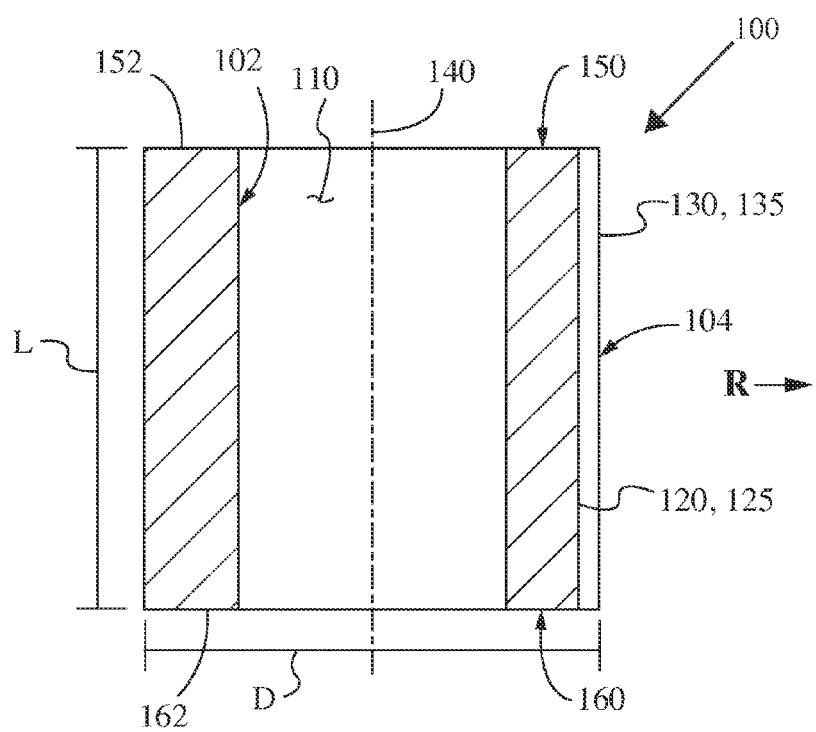
FIG. 9 is a cross-sectional view of the sleeve seal in FIG. 8 along section line 9-9.

In one aspect, as shown in FIGS. 7-9, the sleeve seal 100 may have an inner surface 102 defining a sleeve seal bore 110 and an outer surface 104 including a first portion 120 and a second portion 130. The first portion 120 may be disposed closer to a longitudinal axis 140 of the sleeve seal 100 along a radial direction R than the second portion 130, the radial direction being perpendicular to the longitudinal axis 140. The second portion 130 of the sleeve seal 100 may bear upon the first section 85a of the first guide bore 85. The sleeve seal 100 may include a proximal end 150 having a first end surface 152 and a distal end 160 having a second end surface 162. In one aspect, one or both of the first end surface 152 and the second end surface 162 may be a planar surface perpendicular to the longitudinal axis 140. The sleeve seal 100 may be made of or may include at least one material selected from the group consisting of a 50100 alloy steel, a 52100 alloy steel, and a high density polyethylene. Other suitable materials for the sleeve seal 100 are contemplated to suit the needs of particular applications.

In one aspect, sleeve seal 100 may have a length L to diameter D ratio of 1:1 to 1:3, where the length is an entire length of the sleeve seal from the proximal end 150 to the distal end 160, and where the diameter is two times a radius of the second portion 130. In one aspect, the sleeve seal 100 may have a length to diameter ratio of 1:1.5 to 1:2.0.

In one aspect, the outer surface of the of the sleeve seal 100 may define a plurality of slots or grooves 125 and a plurality of lands 135. Each groove of the plurality of grooves 125 may be defined between adjacent lands of the plurality of lands 135. The plurality of grooves 125 may include the first portion 120 of the sleeve seal 100, and the plurality of lands 135 may include the second portion 130 of the sleeve seal 100. As shown in FIG. 8, the plurality of grooves 125 may have a concave semi-circular profile, however, other shapes and/or profiles are contemplated to lie within the scope of the present disclosure. For example, the plurality of grooves 125 may include a convex, beveled, or planar surface, or a combination thereof, forming a surface for a groove of the plurality of grooves 125.

In one aspect, as shown in FIG. 9, the plurality of grooves 125 may extend at least partly in the longitudinal direction from a proximal end 150 of the sleeve seal 100 toward a distal end 160 of the sleeve seal 100, the longitudinal direction being parallel to the longitudinal axis 140 of the sleeve seal 100. The plurality of grooves 125 may be evenly distributed circumferentially about the outer surface of the sleeve seal 100. In one aspect, the plurality of grooves 125 may have 3 to 64 grooves. In one aspect, the plurality of grooves 125 may have 8 to 32 grooves. In one aspect, the plurality of grooves 125 may have a total of 15 grooves.

Figure 10:
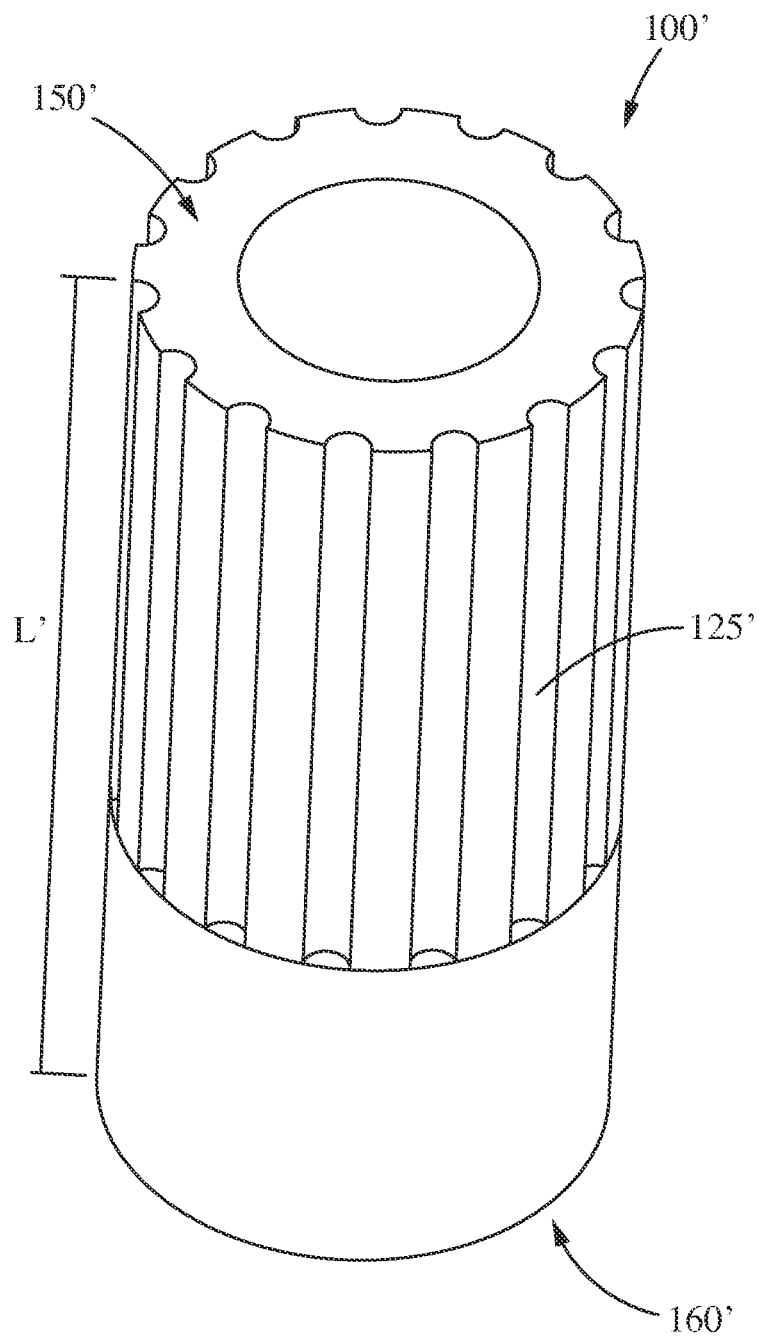
FIG. 10 is a perspective view of a sleeve seal in accordance with aspects of the disclosure.

In one aspect, as shown in FIG. 9, the plurality of grooves 125 may extend an entire length of the sleeve seal 100 along the longitudinal direction from the proximal end 150 to the distal end 160. In one aspect, as shown in FIG. 10, a plurality of grooves 125' may extend less than an entire length L' of a sleeve seal 100' along a longitudinal direction from a proximal end 150' towards a distal end 160'. For example, where the plurality of grooves 125' extend less than the entire length L' of the sleeve seal 100', the plurality of grooves 125' may extend 25% to 90% the entire length L' of the sleeve seal 100'. In other aspects, the plurality of grooves 125, 125', as shown in FIGS. 7 and 10, may extend in a spiral, helical, or non-linear manner from the proximal end 150, 150' towards the distal end 160, 160' of the sleeve seal 100, 100'.

In one aspect, a radial depth 170 between one land of the plurality of lands 135 and an adjacent groove of the plurality of grooves 125 may be constant or substantially the same along the longitudinal direction. The radial depth 170 of the plurality of grooves 125 may be between 200 to 500 micrometers. In one aspect, the radial depth 170 may be defined as a maximum depth of the plurality of grooves 125 at each position along the longitudinal direction of the seal sleeve 100. In one aspect, the radial depth 170 may vary along the longitudinal direction and may decrease from the proximal end 150 to the distal end 160.

Referring to FIGS. 5 and 6, the sleeve seal 100 may be inserted and installed into the first section 85a of the first guide bore 85. The sleeve seal 100 may be installed in the first guide bore 85 via a match grind process. The plurality of lands 135 and the first section 85a of the first guide bore 85 may be dimensioned to have an interference fit. In one aspect, the interference fit may include a 25 to 40 micrometers overlap between the plurality of lands 135 and first section 85a. In other words, an outer diameter of the sleeve seal 100, including the plurality of lands 135, may be larger than an inner diameter of the first section 85a of the first guide bore 85. Additionally, the sleeve seal 100 may be inserted such that the second end surface 162 may be placed in face-to-face contact with the seat portion 85c of the first guide bore 85. At least a portion of the gaseous fuel check 71 may be disposed within the sleeve seal bore 110. In one aspect, the inner diameter of the sleeve seal bore 110 may be between 3 to 8 millimeters wide. In one aspect, the inner diameter of the sleeve seal bore 110 may be between 3 to 4 millimeters wide. In one aspect, the outer diameter of the gaseous fuel check 71 may be between 3 to 8 millimeters wide. In one aspect, the outer diameter of the gaseous fuel check 71 may be between 3 to 4 millimeters wide.

In one aspect, a gap 180 may be present between an outer surface the gaseous fuel check 71 and the sleeve seal bore 110. In one aspect, the gap 180 between the gaseous fuel check 71 and the sleeve seal 100, without the presence of the liquid fuel pressure, is approximately 4 to 8 micrometers. In one aspect, the gap 180 may be approximately 6 micrometers without the presence of the liquid fuel pressure. In one aspect, the sleeve seal 100 may be a dynamic seal and the gap 180 may be reduced due to the liquid fuel pressure of the liquid fuel supply passage 49 and the chamber 84. In one aspect, the gap 180 may be reduced down to between 1 and 4 micrometers when the liquid fuel pressure acts on the plurality of grooves 125 of the sleeve seal 100.

INDUSTRIAL APPLICABILITY

This present disclosure relates generally to fluid injectors, and more particularly to a sleeve seal for a fuel injector. Sleeve seals according to the present disclosure are generally applicable for limiting or preventing leak through a leak path of a fuel injector, which may be used for injecting fuel into an engine for powering a machine.

The machine may be an "over-the-road" vehicle such as a truck used in transportation or may be any other type of machine that performs some type of operation associated with an industry such as mining, construction, farming, transportation, or any other industry known in the art. For example, the machine may be an off-highway truck, a locomotive, a marine vehicle or machine, an earth-moving machine, such as a wheel loader, an excavator, a dump truck, a backhoe, a motor grader, a material handler, or the like. The term "machine" can also refer to stationary equipment like a generator that is driven by an internal combustion engine to generate electricity.

Operation of the fuel injector including the sleeve seal according to aspects of the present disclosure will now be described with reference to FIGS. 5-9.

Liquid fuel may be supplied from the liquid fuel common rail 22 to the liquid fuel supply passage 49 at a high pressure, and gaseous fuel may be supplied from the gaseous fuel common rail 21 to the gaseous fuel supply passage 55 at a medium pressure, the medium pressure being lower than the high pressure of the liquid fuel supply passage 49. In a liquid fuel only mode, a pressure differential between the medium pressure of the gaseous fuel supply passage 55 and the high pressure of the liquid fuel supply passage 49 may be about 40 MPa to 80 MPa, whereas in a mixed or dual fuel mode, the pressure differential may be approximately 5 MPa.

Due to manufacturing tolerances of the gaseous fuel check 71 and an inner surface of the nozzle tip piece 43, a leak path 77 therebetween may allow leakage of liquid fuel from the liquid fuel supply passage 49 to the gaseous fuel supply passage 55. Absent a mechanism for managing a leakage rate through the leak path 77, liquid fuel may accumulate in the gaseous fuel subsystem 23. Furthermore, leakage of liquid fuel into the gaseous fuel subsystem 23 may adversely affect engine emissions, trigger a stop condition of the engine 8, create a blockage of gaseous fuel in the gaseous fuel subsystem 23, and/or result in longer cranking times.

As shown in FIGS. 5 and 6, the sleeve seal 100 may be inserted and installed into the first section 85a of the first guide bore 85. The sleeve seal 100 may include the plurality of grooves 125, which may be in fluid communication with the chamber 84 and the liquid fuel supply passage 49. In one aspect, when liquid fuel is supplied to the liquid fuel supply passage 49 and the chamber 84, the liquid fuel pressure may be applied at least radially inwardly on the plurality of grooves 125 towards a center of the sleeve seal 100. In turn, the sleeve seal bore 110 may be deformed inwardly towards the gaseous fuel check 71, thereby reducing the gap 180 may be present between the gaseous fuel check 71 and the sleeve seal bore 110. In this compressed state, the sleeve seal bore 110 may squeeze or cinch down around the gaseous fuel check 71 to reduce the gap 180. The reduction in the gap 180 may minimize or eliminate liquid fuel flow between the gaseous fuel check 71 and the sleeve seal 100.

In one aspect, the liquid fuel pressure may also be applied axially on the first end surface 152, thereby asserting an axial force on the sleeve seal 100 towards the seat portion 85c of the first guide bore 85. The axial force may press the sleeve seal 100 against the seat portion 85c to reduce a clearance between the sleeve seal 100 and the seat portion 85c, thereby minimizing or eliminating a fuel flow path along the seat portion 85c.

During the liquid fuel only mode, the gaseous fuel check 71 may typically remain in the advanced position, blocking the gaseous fuel nozzle outlet 54. The sleeve seal 100 may be maintained in an inwardly deformed state, squeezing about the gaseous fuel check 71 and minimizing or eliminating migration of the liquid fuel to the gaseous fuel subsystem 23. In one aspect, the squeezing may cause the gap 180 between the gaseous fuel check 71 and the sleeve seal 100 to reduce down to less than 6 micrometers. In one aspect, the squeezing may cause the gap 180 to reduce down to between 1 and 4 micrometers.

When it is desirable to return to a gaseous fuel only mode or a mix fuel mode, the pressure differential between the chamber 84 and the nozzle chamber 96 may be decreased, thereby reducing the squeezing of the sleeve seal 100 about the gaseous fuel check 71. In one aspect, the reduced squeezing may cause the gap 180 to expand or return to a distance of 4 to 8 micrometers. In one aspect, the reduced squeezing may cause the gap 180 to expand to a distance of approximately 6 micrometers.

It will be appreciated that the foregoing description provides examples of the disclosed fuel injector and sleeve seal. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:
1. A fuel injector for an internal combustion engine, the fuel injector comprising:
  an injector body defining a liquid fuel passage extending between a liquid fuel inlet and a liquid fuel outlet, a gaseous fuel passage extending between a gaseous fuel inlet and a gaseous fuel nozzle outlet, and a first guide bore;
  a gaseous fuel check guided within the first guide bore between a retracted position and an advanced position to selectively open and block, respectively, fluid communication between the gaseous fuel passage and the gaseous fuel nozzle outlet; and
  a sleeve seal seated within the first guide bore, the sleeve seal having an inner surface defining a sleeve seal bore therethrough, and at least a portion of the gaseous fuel check is disposed within the sleeve seal bore,
    an outer surface of the sleeve seal including a first portion and a second portion, the first portion being disposed closer to a longitudinal axis of the sleeve seal bore along a radial direction than the second portion, the radial direction being perpendicular to the longitudinal axis, wherein the outer surface of the sleeve seal defines a plurality of grooves and a plurality of lands, each groove of the plurality of grooves being defined between adjacent lands of the plurality of lands, the plurality of grooves including the first portion of the sleeve seal, and the plurality of lands including the second portion of the sleeve seal, and wherein fluid pressure from the liquid fuel inlet applies at least a radially inward pressure on the plurality of grooves to increase sealing contact between the sleeve seal bore and an outer surface of the gaseous fuel check,
    the first portion of the outer surface of the sleeve seal being in fluid communication with the liquid fuel passage,
    a distal portion of the gaseous fuel check extending along the longitudinal axis on a first side of the sleeve seal, and being in fluid communication with the gaseous fuel inlet, and
    a proximal portion of the gaseous fuel check extending along the longitudinal axis on a second side of the sleeve seal, opposite of the first side of the sleeve seal, and being in fluid communication with the liquid fuel inlet.

2. The fuel injector of claim 1, wherein the second portion of the outer surface of the sleeve seal bears upon the first guide bore.

3. The fuel injector of claim 1, wherein the plurality of grooves extend at least partly in a longitudinal direction from a proximal end of the sleeve seal toward a distal end of the sleeve seal, the longitudinal direction being parallel to the longitudinal axis of the sleeve seal.

4. The fuel injector of claim 1, wherein the plurality of grooves are evenly distributed circumferentially about the outer surface of the sleeve seal.

5. The fuel injector of claim 1, wherein a radial depth between one land of the plurality of lands and an adjacent groove of the plurality of grooves is between 20 to 40 micrometers.

6. The fuel injector of claim 1, wherein the first guide bore of the injector body includes a first section, a second section, and a seat portion located between the first section and the second section, and
wherein the first section has a diameter that is larger than a diameter of the second section.

7. The fuel injector of claim 1, wherein the sleeve seal includes at least one material selected from the group consisting of a 50100 alloy steel, a 52100 alloy steel, and a high density polyethylene.

8. The fuel injector of claim 1, wherein the injector body defines a second guide bore therein, and the liquid fuel outlet includes a liquid fuel nozzle outlet,
the fuel injector further comprising a liquid fuel check guided within the second guide bore between retracted and advanced positions to selectively open and block, respectively, fluid communication between the liquid fuel passage and the liquid fuel nozzle outlet.

9. The fuel injector of claim 8, wherein the injector body further includes a tip piece defining the first guide bore and the second guide bore receiving the gaseous fuel check and the liquid fuel check, respectively, the tip piece having the liquid fuel nozzle outlet and the gaseous fuel nozzle outlet formed thereon.

10. A dual fuel system for an internal combustion engine, the dual fuel system comprising:
a liquid fuel supply;
a gaseous fuel supply; and
a plurality of fuel injectors for supplying liquid fuel from the liquid fuel supply and supplying gaseous fuel from the gaseous fuel supply into cylinders of the internal combustion engine, each fuel injector of the plurality of fuel injectors comprising
an injector body defining a liquid fuel passage extending between a liquid fuel inlet and a liquid fuel outlet, a gaseous fuel passage extending between a gaseous fuel inlet and a gaseous fuel nozzle outlet, and a first guide bore,
a gaseous fuel check guided within the first guide bore between a retracted position and an advanced position to selectively open and block, respectively, fluid communication between the gaseous fuel passage and the gaseous fuel nozzle outlet, and
a sleeve seal seated within the first guide bore, the sleeve seal having an inner surface defining a sleeve seal bore therethrough, and at least a portion of the gaseous fuel check is disposed within the sleeve seal bore,
an outer surface of the sleeve seal including a first portion and a second portion, the first portion being disposed closer to a longitudinal axis of the sleeve seal bore along a radial direction than the second portion, the radial direction being perpendicular to the longitudinal axis, wherein the outer surface of the sleeve seal defines a plurality of grooves and a plurality of lands, each groove of the plurality of grooves being defined between adjacent lands of the plurality of lands, the plurality of grooves including the first portion of the sleeve seal, and the plurality of lands including the second portion of the sleeve seal, and wherein fluid pressure from the liquid fuel inlet applies at least a radially inward pressure on the plurality of grooves to increase sealing contact between the sleeve seal bore and an outer surface of the gaseous fuel check,
the first portion of the outer surface of the sleeve seal being in fluid communication with the liquid fuel passage,
a distal portion of the gaseous fuel check extending along the longitudinal axis on a first side of the sleeve seal, and being in fluid communication with the gaseous fuel inlet, and
a proximal portion of the gaseous fuel check extending along the longitudinal axis on a second side of the sleeve seal, opposite of the first side of the sleeve seal, and being in fluid communication with the liquid fuel passage.

11. The dual fuel system of claim 10, wherein the second portion of the outer surface of the sleeve seal bears upon the first guide bore.

12. The dual fuel system of claim 10, wherein the plurality of grooves extend at least partly in a longitudinal direction from a proximal end of the sleeve seal toward a distal end of the sleeve seal, the longitudinal direction being parallel to the longitudinal axis of the sleeve seal.

13. The dual fuel system of claim 10, wherein the plurality of grooves are evenly distributed circumferentially about the outer surface of the sleeve seal.

14. The dual fuel system of claim 10, wherein a radial depth between one land of the plurality of lands and an adjacent groove of the plurality of grooves is between 20 to 40 micrometers.

15. The dual fuel system of claim 10, wherein the first guide bore of the injector body includes a first section, a second section, and a seat portion between the first section and the second section, and
wherein the first section has a diameter that is larger than a diameter of the second section.

16. The dual fuel system of claim 10, wherein the sleeve seal includes at least one material selected from the group consisting of a 50100 alloy steel, a 52100alloy steel, and a high density polyethylene.

17. The dual fuel system of claim 10, wherein the injector body defines a second guide bore therein, and the liquid fuel outlet includes a liquid fuel nozzle outlet,
the fuel injector further comprising a liquid fuel check guided within the second guide bore between retracted and advanced positions to selectively open and block, respectively, fluid communication between the liquid fuel passage and the liquid fuel nozzle outlet.

* * * * *